(12) United States Patent
Carey (10) Patent No.: US 12,499,229 B2
(45) Date of Patent: Dec. 16, 2025

(54) SYSTEM AND METHOD FOR EVALUATING INTEGRITY OF ISOLATED DIGITAL ASSETS

(71) Applicant: The Toronto-Dominion Bank, Toronto (CA)

(72) Inventor: John Francis Carey, Whtiby (CA)

(73) Assignee: The Toronto-Dominion Bank, Toronto (CA)

( * ) Notice: Subject to any disclaimer, the term of this patent is extended or adjusted under 35 U.S.C. 154(b) by 253 days.

(21) Appl. No.: 18/318,764

(22) Filed: May 17, 2023

(65) Prior Publication Data

US 2024/0385949 A1    Nov. 21, 2024

(51) Int. Cl.
G06F 21/56    (2013.01)
G06F 16/23    (2019.01)

(52) U.S. Cl.
CPC ........ G06F 21/565 (2013.01); G06F 16/2365 (2019.01)

(58) Field of Classification Search
None
See application file for complete search history.

(56) References Cited

U.S. PATENT DOCUMENTS

| | | | |
|---|---|---|---|
| 7,647,643 B2 | 1/2010 | Lauer et al. | |
| 10,044,718 B2 | 8/2018 | Burrows et al. | |
| 10,102,218 B2 | 10/2018 | Lee et al. | |
| 10,148,662 B1 | 12/2018 | Clark et al. | |
| 10,212,166 B2 | 2/2019 | Xie et al. | |
| 11,194,559 B2 | 12/2021 | Tashkandi | |
| 11,611,615 B1 * | 3/2023 | Long | H04L 67/108 |
| 2017/0255666 A1 | 9/2017 | Rueger et al. | |
| 2021/0216306 A1 * | 7/2021 | Moeller | G06F 8/656 |
| 2022/0366810 A1 * | 11/2022 | Chan | G06F 3/04815 |
| 2023/0135632 A1 * | 5/2023 | Smolen | H04L 9/3236 713/168 |
| 2024/0403392 A1 * | 12/2024 | Michelet | G06Q 10/0833 |

* cited by examiner

*Primary Examiner* — Jeffrey R Swearingen
(74) *Attorney, Agent, or Firm* — CPST Intellectual Property Inc.; Brett J. Slaney; Amy Scouten (57) ABSTRACT

A device, method, and computer readable medium for conducting data integrity analyses is disclosed. Illustratively, the method includes transmitting a first script to a target device. The target device is at least in part isolated from an enterprise storing data elements on the target device to isolate them from subsystems of the enterprise. In some examples, the data elements may comprise data generated through machine learning. The first script includes instructions to search a target device for one or more properties, to create a data file based on found properties, to create a unique immutable property based on each data file, and to create an aggregated immutable property list for all data files generated by the first script. The first script is configured to locally store information generated by the first script upon execution, and remove the first script after execution. The method includes transmitting a second script, complementary to the first script, to evaluate integrity of information generated by the first script.

20 Claims, 9 Drawing Sheets

SYSTEM AND METHOD FOR EVALUATING INTEGRITY OF ISOLATED DIGITAL ASSETS

TECHNICAL FIELD

The following relates generally to evaluating digital system integrity and, in particular, to evaluating integrity of at least in part isolated digital systems.

BACKGROUND

Many current approaches to evaluating system integrity are based on storing a relatively immutable derivative property of a digital asset (e.g., a checksum) in a safe place, away from the asset, for use as a reference. These existing approaches are focused on removing the immutable property associated with the asset to a safe space. Once in the safe space, the approaches can control access to the associated property or environment, and obscure the form of the associated property to make it difficult to find in the safe environment.

BRIEF DESCRIPTION OF THE DRAWINGS

Embodiments will now be described with reference to the appended drawings wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It is understood that the use of the term "unique immutable property," derived from or associated with a digital asset is not intended to be limited to, for example, the output property of a particular one-way function. To provide an example, the unique immutable property associated with or derived from the digital asset is not intended to be limited to a particular hashing function used to generate a checksum file, the form, or other limiting parameters of either the one-way function or the generated output, etc. It is also understood that while the term "unique immutable property" can imply total immutability and uniqueness, it is not intended to be interpreted in a binary manner. Instead, the immutability and uniqueness are understood to describe relative properties of operations known to persons skilled in the art, and it is acknowledged that existing approaches (such as certain hash functions) include unknown vulnerabilities, and can include known vulnerabilities. Relatedly, the use of the term "isolated" is intended to be interpreted similarly to the above, both in that it is not intended to be limited to a particular type of isolation (e.g., isolated from certain access rights, isolated connectivity, etc.), and in that it is understood that isolation can mean complete isolation, isolation in part, etc., unless indicated otherwise.

In addition, it is understood that the use of the term "data file," also referred to as a "data asset" is not intended to be limited solely to individual data files, and that an expansive definition of the term is intended unless specified otherwise. For example, the data file can store information in different formats, can be stored on different media (e.g., a database, a portable data stick, etc.), etc. The data file may not necessarily be an independent file, and can be part of a data file, or include a routine, method, object, etc.

This disclosure relates to evaluating integrity of isolated digital assets. Maintaining a system for evaluating the isolated digital assets is to be practical, sufficiently secure so as to decrease the risk that adversaries can penetrate the evaluation scheme and/or the isolated system, and is to operate within the constraints of the isolated digital asset (e.g., isolated assets can preclude using more sophisticated tools that require interconnection or introduce other certainties).

The disclosed method can include the following features to address these technical challenges. An example method includes two scripts that are self-contained, such that a single transmission (or two transmissions, one for each script) is sufficient to enable the evaluation. The scripts perform relatively simple operations to determine the integrity of properties of the isolated system, as described herein, such that large applications are not required, the evaluation is relatively quick, and the integrity of a plurality of different features can be checked. The scripts remove themselves after performing the evaluation, to reduce the likelihood that adversaries can compromise the evaluation.

In one aspect a device for conducting data integrity analyses is disclosed. The device is at least in part an isolated from an enterprise storing data elements on the device to isolate the data elements from subsystems of the enterprise. The device includes a processor, a communications module coupled to the processor, and a memory coupled to the processor. The memory stores computer executable instructions that when executed by the processor cause the processor to receive a first script. The first script includes instructions to search the device for one or more properties, to create a data file based on found properties, to create a unique immutable property based on each data file, and to create an aggregated immutable property list for all data files generated by the first script. The instructions cause the processor to execute the first script, locally store created information generated by the first script, and remove the first script. The instructions cause the processor to execute a second script, complementary to the first script, to evaluate integrity of the created information.

In example embodiments, the created data file is at least in part a list populated with results of the search.

In example embodiments, the first script is configured to search for access control properties of one or more files.

In example embodiments, the second script is configured to remove itself after completion.

In example embodiments, the instructions cause the processor to indicate that the evaluation has failed in response to a first timing threshold being unsatisfied.

In example embodiments, the instructions cause the processor to transmit results of the evaluation to a controller to modify the found one or more properties.

In example embodiments, the instructions cause the processor to validate the respective immutable property for each data file based on contents of a validated aggregated immutable property list. In example embodiments, the instructions cause the processor to validate the data file based on respective validated immutable properties for each data file.

In example embodiments, the instructions cause the processor to validate the aggregated immutable property list by (1) extracting a reference feature introduced to, and based on the aggregated immutable property list, the reference feature introduced after aggregation of the immutable properties based on each data file into the aggregated immutable property list, (2) create a test reference feature based on the post-extraction aggregated immutable property list, and (3) compare the extracted reference feature to the test reference feature. In example embodiments, reference feature is stored within the aggregated immutable property list based on an obfuscation policy.

In example embodiments, the aggregated immutable property list stores immutable properties based on each data file along with data-specific reference properties, and the immutable properties are mapped to their respective data filed based on the associated data-specific reference properties for validation. In example embodiments, the data-specific reference properties are generated based on a name of the associated data file.

In another aspect a method for conducting data integrity analyses is disclosed. The method includes transmitting a first script to a target device. The first script includes instructions to search a target device for one or more properties, to create a data file based on found properties, to create a unique immutable property based on each data file, and to create an aggregated immutable property list for all data files generated by the first script. The first script is configured to locally store information generated by the first script upon execution, and remove the first script after execution. The method includes transmitting a second script, complementary to the first script, to evaluate integrity of information generated by the first script. The target device is at least in part isolated from an enterprise storing data elements on the device to isolate the data elements from subsystems of the enterprise.

In example embodiments, for the method, the created data file is at least in part a list populated with results of the search.

In example embodiments, for the method, the first script is configured to search for access control properties of one or more files.

In example embodiments, for the method, the second script is configured to remove itself after completion.

In example embodiments, the method includes failing the evaluation in response to a first timing threshold being unsatisfied.

In example embodiments, the method includes transmitting results of the evaluation to a controller to modify the found one or more properties.

In example embodiments, the method includes validating the respective immutable property for each data file based on contents of a validated aggregated immutable property list. In example embodiments, the method includes validating the data file based on respective validated immutable properties for each data file.

In example embodiments, the method includes validating the aggregated immutable property list by (1) extracting a reference feature introduced to, and based on the aggregated immutable property list, the reference feature introduced after aggregation of the immutable properties based on each data file into the aggregated immutable property list, (2) creating a test reference feature based on the post-extraction aggregated immutable property list, and (3) comparing the extracted reference feature to the test reference feature. In example embodiments, reference feature is stored within the aggregated immutable property list based on an obfuscation policy.

In example embodiments, the aggregated immutable property list stores immutable properties based on each data file along with data-specific reference properties, and the immutable properties are mapped to their respective data filed based on the associated data-specific reference properties for validation. In example embodiments, the method includes the data-specific reference properties being generated based on a name of the associated data file.

In another aspect, a non-transitory computer readable medium for performing any one of the method steps described here.

Figure 1:
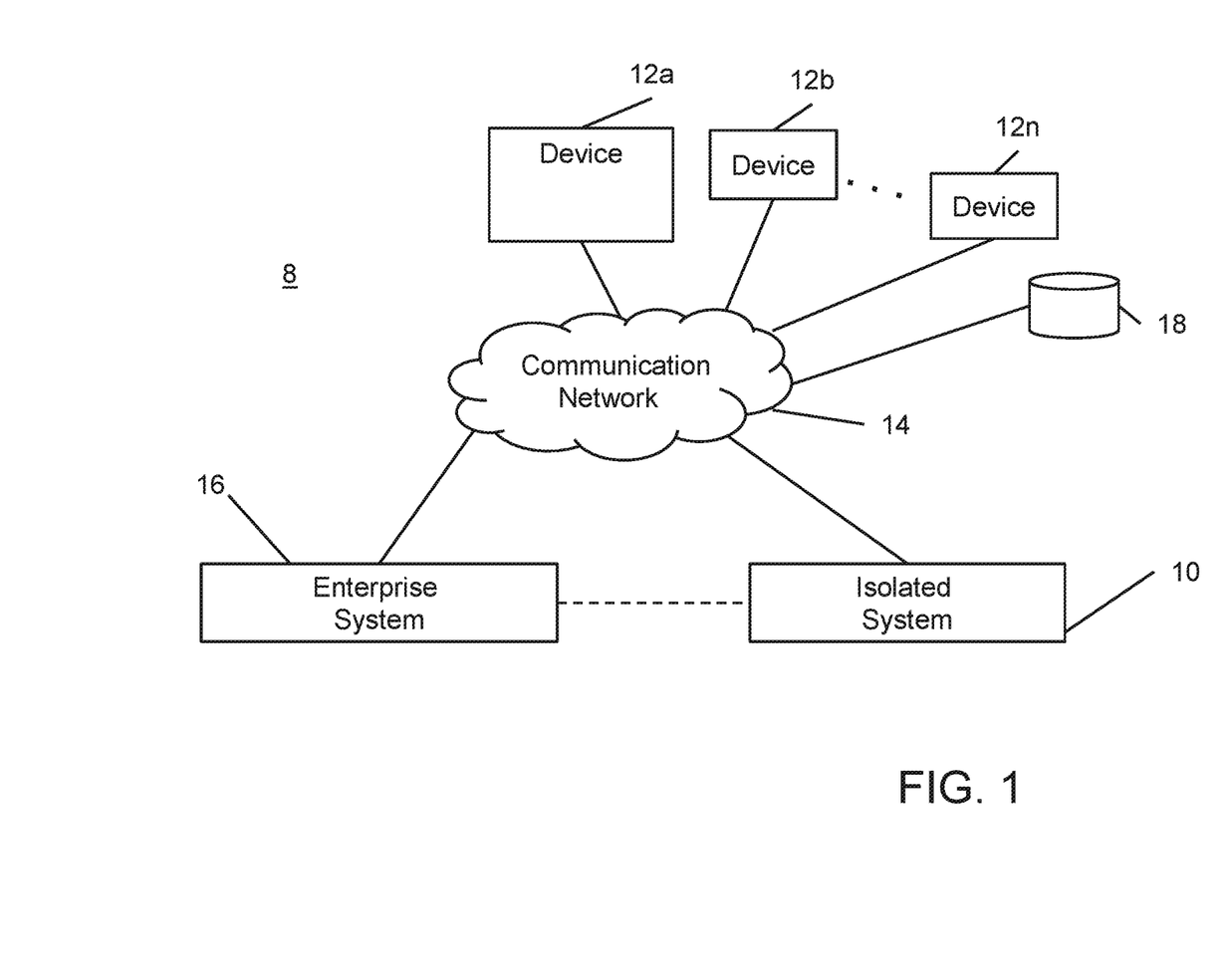
FIG. 1 is a schematic diagram of an example computing environment.

Referring now to the figures, FIG. 1 illustrates an example of a computing environment 8. The computing environment 8, as shown, includes an isolated platform 10, one or more client devices 12 (shown by client devices 12a, 12b . . . 12n, hereinafter referred to in the singular for ease of reference), and a communications network 14 connecting one or more components of the computing environment 8.

The computing environment 8 can also include an enterprise system 16 (e.g., a financial institution such as commercial bank and/or insurance provider). It is noted that the enterprise system 16 can include different components, which components have been omitted from FIG. 1 for clarity.

The system 16 can provide services to users (e.g., to process financial transactions), which services generate, or result in the enterprise system 16 coming into possession of, or are responsible for the storage and access control of various data and/or processes that can be commercially sensitive, or personally sensitive, etc. As a result, the enterprise system 16 can be configured to keep said sensitive data as confidential information.

This application is directed to applications where the aforementioned confidential information is at least in part stored in an isolated platform 10. The isolated platform 10 can be partially isolated, totally isolated, etc. As noted above, the nature of isolation of the isolated platform 10, and extent of isolation can vary based on the desired application. Digital liabilities or assets (hereinafter referred to more generally as "digital elements") are stored in the isolated platform 10 at least in part to prevent them from being able to, or from having the potential to, interact with other systems or subsystems (whether internal to the enterprise system 16, or otherwise). For example, the isolation can be enforced by preventing individuals or processes from accessing the data, or by positively defining individuals, processes, etc., that are able to access the isolated platform 10. In example embodiments, the digital elements on the isolated platform 10 are sensitive or confidential data. The isolated platform 10 can be limited to access only certain data or tools to perform only rudimentary functions. For example, the isolated platform 10 can be configured to receive and operate commands only from a particular client device 12 within the enterprise system 16, to only accept certain types of commands from the designated device, etc. In example embodiments, the isolated platform 10 is isolated from other systems of the enterprise system 16. For example, the isolated platform 10 can be updated with new entries specifying access control rights within the enterprise system 16 (which updating occurs in a controlled fashion) and update a cloud datastore 18 to propagate the access control right changes to the organization (also controlled in a restricted fashion), while being isolated from all but select devices 12 or users of the enterprise system 16 (i.e., the users or devices with permission or granted access to update the access control rights). The isolated platform 10 in this instance can be a necessity to avoid risks associated with such sensitive processes being integrated within a larger system with more complicated threat matrices to control.

Confidential data and/or processes (or related data and/or processes) of the enterprise system 16 are at least in part stored in the isolated platform 10, temporarily or otherwise. For example, the isolated platform 10 can store data elements generated by the operation of the enterprise system 16 prior to their being provided to a cloud database 18. In another example, the isolated platform 10 can store processes which have stricter access control or relate to access control for a broader set of enterprise system 16 subsystems.

The enterprise system 16 can directly (e.g., by transmitting data to the isolated platform 10 from a device (e.g., device 12a) within the system 16), or indirectly (e.g., via a device 12 of the third-party contractor, etc.) store digital elements, and similarly require storage of the digital elements on the isolated platform 10 for a variety of processes. The digital elements can be stored on the isolated platform 10 in a particular configuration (e.g., encrypted), unencrypted in part, in a particular format, etc.

The digital elements can include team, intranet, messaging, committee, or other client- or relationship-based data. The digital elements can be data that is not controlled by certain processes within an enterprise system 16, or otherwise (e.g., enterprise system 16 generated data). For example, the digital elements can include information about third party applications used by employees, such as human resources, information technology (IT), payroll, finance, or other specific applications. The digital elements may include data associated with a user of a client device 12 that interacts with the isolated platform 10, and/or the enterprise system 16 (e.g., an employee, or other user associated with an organization associated with the enterprise system 16, or a customer, etc.).

More generally, the digital elements can include data and/or related processes which can include or rely upon: customer data, enterprise data, or personal data associated with a client device 12, system 16, or platform 10, and can include, for example, and without limitation, financial data, transactional data, personally identifiable information, data related to personal identification, demographic data (e.g., age, gender, income, location, etc.), preference data input by the client, and inferred data generated through machine learning, modeling, pattern matching, or other automated techniques. In at least one example embodiment, the digital elements include any data provided to a financial institution which is intended to be confidential, whether the data is provided by a client, employee, contractor, regulator, etc., whether for personal or enterprise uses, or otherwise. The digital elements may include historical interactions and transactions associated with the isolated platform 10 and/or enterprise system 16, e.g., login history, search history, communication logs, documents, etc.

There is a need for the isolated platform 10 to perform integrity or other types of evaluations on digital assets or liabilities (referred to hereinafter more generally as "digital elements") isolated therein. The isolated platform 10 may have access to certain tools to perform such analyses. For example, the platform 10 can have access to rudimentary tools (e.g., a tool to create unique immutable properties for data files to isolated platform 10) to facilitate such analysis. In example embodiments, a platform 10 can temporarily store such tools to prevent tampering therewith. Any such tools (whether provided to the platform 10 or native thereto) can be isolated in the same fashion as the isolated platform 10 is isolated.

The isolated platform 10 can be configured to store data related to any analysis conducted thereon (hereinafter referred to generally as a log). The log can serve as chronologically accurate reference. The log can be encrypted, stored in a particular portion of the platform 10, and can be used for outlining malicious activity encountered by the platform 10 for later retrieval.

It can be appreciated that while the isolated platform 10 and enterprise system 16 are shown as separate entities in FIG. 1, they may also be part of the same system. For example, the isolated platform 10 can be hosted and provided within the enterprise system 16.

Client device 12 may be associated with one or more users. Users may be referred to herein as employees, customers, clients, consumers, correspondents, or other entities that interact with the enterprise system 16 and/or isolated platform 10 (directly or indirectly). The computing environment 8 may include multiple client devices 12, each client device 12 being associated with a separate user or associated with one or more users. In certain embodiments, a user may operate client device 12 such that client device 12 performs or causes the platform 10 to perform one or more processes consistent with the disclosed embodiments. For example, the user may use client device 12 to engage and interface with the isolated platform 10 via a mobile or web-based applications provided by the enterprise system 16, which is provided within, or is complementary to, the isolated platform 10 to perform analyses. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12, enterprise system(s) 16, datastore(s) 20, and/or isolated platform(s) 10. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

In one embodiment, isolated platform 10 may be one or more computer systems configured to process and store information and execute software instructions to perform one or more processes consistent with the disclosed embodiments. In certain embodiments, although not required, isolated platform 10 may be associated with one or more business entities. In certain embodiments isolated platform 10 may represent or be part of any type of business entity. For example, the isolated platform 10 may be a system associated with a commercial bank (e.g., enterprise system 16), a digital media service provider, or some other type of business which performs data analysis (e.g., a cloud computing provider). The isolated platform 10 can also operate as a standalone entity that is configured to serve multiple business entities, e.g., to act as an agent thereof.

The isolated platform 10 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the isolated platform 10 and/or enterprise system 16. The cryptographic server may be used to protect, for example, the digital elements on which analysis is being performed, etc., by way of encryption for data protection, digital signatures, or message digests for data integrity, and by using digital certificates to authenticate the identity of the users and client devices 12 with which the enterprise system 16 and/or isolated platform 10 communicates to inhibit data breaches by adversaries. It can be appreciated that various cryptographic mechanisms and protocols can be chosen and implemented to suit the constraints and requirements of the particular deployment of the isolated platform 10 or enterprise system 16 as is known in the art.

Figure 2:
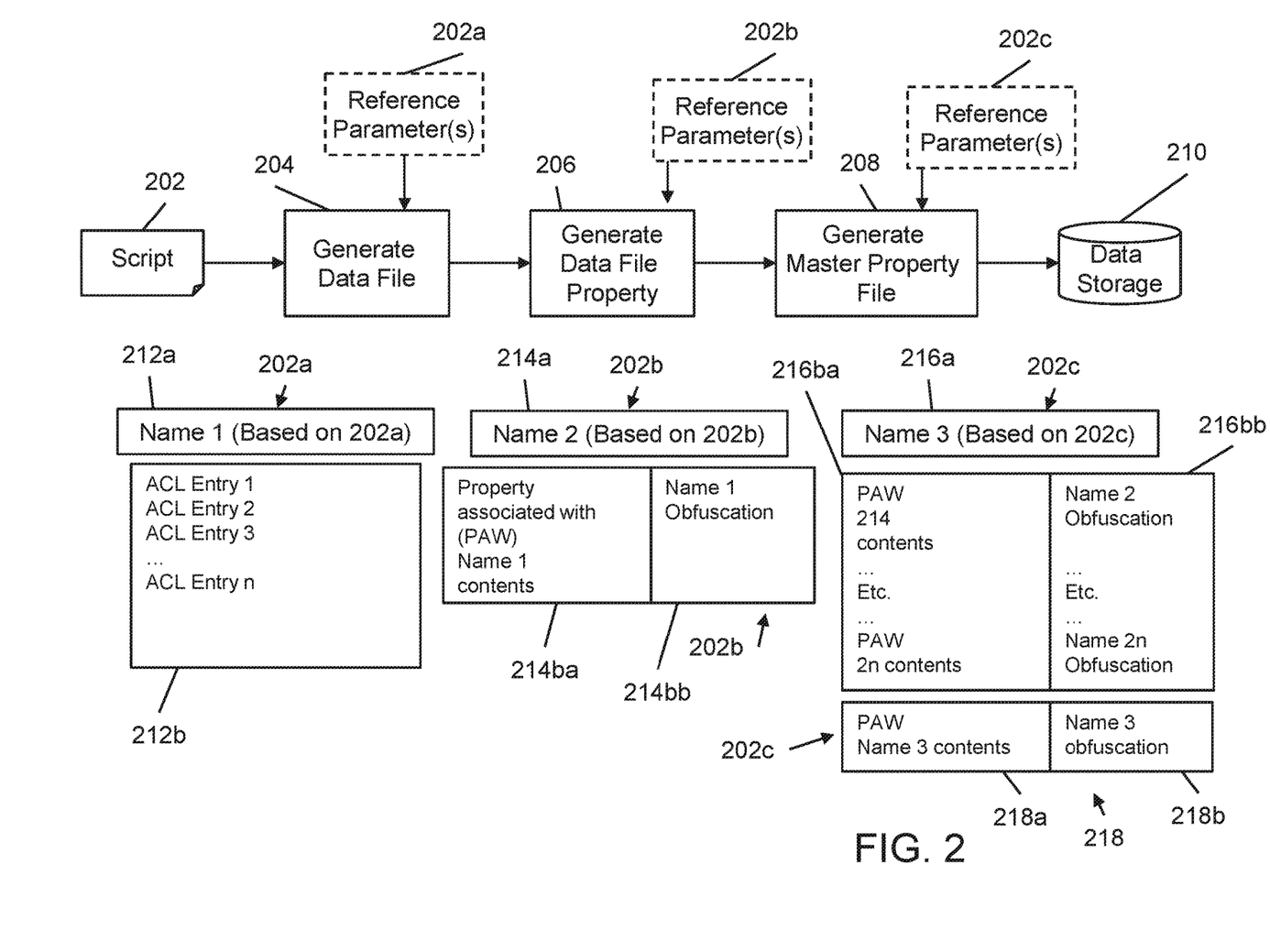
FIG. 2 is a block diagram of an example workflow of part of evaluating the integrity of isolated digital assets with the disclosure herein.

FIG. 2 is a block diagram of an example workflow of part of evaluating the integrity of isolated digital assets.

Initially, the isolated platform 10 receives a script 202 (hereinafter referred to as the first script 202, for ease of reference). The first script 202 is for performing analysis on digital elements stored on the isolated platform 10. The first script 202 can be in whole, or in part, self-contained. That is, the first script 202 can include all the tools necessary to perform the analysis of the isolated platform 10, or rely on certain tools (e.g., rudimentary, isolated tools) of the isolated platform 10 to perform the analysis. In this way, the first script can be provided to the isolated platform 10 to reduce the amount of failure or breach avenues for platform 10.

The first script 202 includes, or is configured with, one or more reference parameters, shown visually as separate reference parameters 202a, 202b, and 202c, for added clarity. The reference parameters, as described herein, control one or more aspects of an analysis performed by the first script 202. In example embodiments, such as the one shown in FIG. 2, different reference parameters control different stages of the analysis. Other variations in respect of parameters are contemplated.

At stage 204, a data file is generated by the first script 202. The generated data file can be at least in part a list populated with results of a search performed by the first script. The data file can include various components, including metadata, substantive data, etc. An example data file, data file 212, is shown in FIG. 2. The data file 212 includes a name 212a, generated by the first script 202 in accordance with the reference parameters 202a, and the data file 212 includes a body 212b.

The reference parameters 202a, 202b, and 202c, more generally, can define a schema for how names are generated, or how other portions of the first script 202, or second script (as that term is used herein), or another script traverses or process the data resulting from the first script 202. For example, the name 212a can be based on the reference parameter 202a. Particularizing one example, the reference parameter 202a can specify that the name 212a is based on a time the data file 212 is generated (e.g., the name starts with a date and time component), based on substantive material expected to be stored in the platform 10 (e.g., for access control lists, the name 212a can start with "ACL"), based on a security tool (e.g., incorporate a hash value generated by a one-way function), be the result of a changing configuration (e.g., the naming convention is periodically changed by the generator of the first script 202), etc. The reference parameters 202a, 202b, and 202c complement the reference parameters of the second script, as will be discussed herein.

Each of the reference parameters 202a, 202b, and 202c can be based on a different scheme or methodology. Various combinations of different mechanisms both within a reference parameter, and between reference parameters 202a, 202b, and 202c are contemplated. For example, the parameters 202a can enforce a naming convention, the parameter 202b can be used to describe processes that will occur to a body 212b, and the parameters 202c can use a naming convention different from the reference parameters 202a, and partially process the body 212b with a different security tool.

In the shown embodiment, the reference parameter 202a specifies that the name 212a is defined by the type of data expected to be stored in the platform 10, and a time.

The body 212b can include one or more entries associated with data elements stored on the platform 10 based on reference parameters 202a. For example, the reference parameters 202a can operate such that the first script 202 searches through a certain portion of data on the platform 10 (e.g., only certain directories of data stored in the platform 10, such as a directory associated with a particular business line), extracts information based on particular elements within search directories (e.g., binaries, configuration files, etc.), and extracts certain information or parameters related to same (e.g., access control logs, or "ACL"s) in order to generate the data file 212. The body 212b can be a listing of all relevant extracted properties. To particularize just one contemplated example, the body 212b can include a listing of different access ACLs for different programs or data elements stored on the platform 10. The body 212b can identify directories where the extracted ACLS were present on the platform 10 at the time of the search by the first script 202. The body 212b can also include other indicator(s), parameters, properties, etc. describing the state of both the organization of the data elements on the platform 10, and the contents of the data elements at the time of the search.

At block 206, a unique and immutable property of the data file 212 is generated. The aforementioned property is unique to the extent that is possible with present security instruments, such as one-way functions that generate hash values based on provided information. The aforementioned property is immutable in that if the data file 212 is not tampered with, the security tool will be able to reproduce the property (i.e., as in the case with one-way functions and hash values.). In the embodiment shown, the unique and immutable property of the data file 212 is a hash function.

One or more portions of the data file 212 can be used to generate the unique and immutable property (referred to hereinafter simply as the property, for ease of reference) based on the reference parameters 202b. For example, in the shown embodiment, the parameters 202b are such that a property is generated based on the name of data file 212 and is stored in a second data file 214 as a property in body 214ba resulting from the block 206. In example embodiments, the data file 214 stores the properties in body 214ba in conjunction with a reference 214bb. The reference can be a reference based on the name 212a. For example, the reference 214bb can be the result of a process as simple as reversing the name of the data file 212, or complicated, including being the result of a cypher, etc. The data file 214 can itself be given a name 214a, based on the reference parameters 202b. For example, the name 214a can incorporate a timestamp of when the block 206 is executed. As with the reference element 214bb, the name 214a can be generated with a range of different approaches.

At block 208, a master property file 216 is generated by the first script 202 based on the reference parameters 202c. Similar to the data file 214, the property file 216 can include a name 216a, and a body 216b. The name can be generated in a manner similar to the names 214a, 212a.

To generate the body 216b, the first script can generate one or more unique and immutable properties of the data file 214. For example, in the shown embodiment, the body 216b includes a body 216ba of generated properties of the body 214b of the data file 214. That is, the first script 202 can generate the name 212a based on reference parameters 202a, generate a hash of the name 212a and store that hash in the body 214ba of the second data file 214, and in the master property file body 216ba store a hash of the hashed name from body 214ba. Relatedly, the first script can generate corresponding name obfuscations identifying the generated property, shown as being listed in reference 216bb.

Block 208 can also include the first script 202 generating a data element for insertion into the data file 216. For example, in the shown embodiment, the first script generates the data element 218 (also based on the reference parameters 202c) based on the aggregated immutable property list (body 216b). The data element 218 can be a reference feature, as described herein.

After creating data element 218, the first script 202 inserts the element 218 into, or incorporates it into body 216b (i.e., the separation shown in FIG. 2 is illustrative) as a reference feature. In example embodiments, the first script 202 generates a new data file (not shown) without delineation between the inserted data element 218 and the body 216b.

The element 218 can include a first portion 218a that results from generating the property from the body 216b (similar to the process used to generate the body 216b), and a portion 218b for identifying the portion 218a. In the shown embodiment, the portion 218a is based on the parameters 202c and an obfuscation policy (e.g., a naming convention) therein, wherein the portion 218b is based on the name 216a.

At block 210, the data files 212, 214, and 216 are stored locally on the platform 10.

Block 210 can include the first script 202 deleting itself, to remove the potential that an adversarial actor will be able to reverse engineer the script. Removal can include removal of all traces, including the stored script and any traces leftover in memory.

To summarize by way of an example, in at least one example embodiment, the block 206 includes generating at least a hash value for storage in body 214ba (a first hash value) and generating an obfuscated name to associate with that hashed value. Block 208 includes generating a hash value (the second hash value) based on the first hash value(s), incorporating the generated obfuscated names, and generating obfuscations of the name generated by block 206. Block 208 also includes generating a hash value based on the second hash value, resulting in a third hash value stored in an insertable element 218. In at least some example embodiments, the name obfuscation also includes generating hash values based on preceding names, thereby increasing the amount of derivative, nested hash values used to assess integrity.

This above-described approach can potentially alleviate some issues associated with the isolated platform 10. First, the described approach is relatively light weight, with a relatively large amount of processing (after searching) being expended to process names, and not the contents of the body 212b. Second, the nested approach enables relatively simple scripts, such that the size of the script makes it harder for adversaries to introduce altered functionality in copycat scripts. Third, the nested configuration and focus on naming makes the process robust and able to assess various properties of a target device.

The first script 202 can generate a single data file 212 based on a single search, generate multiple data files 212 based on a single search, or generate multiple data files 212 based on different searches. Similarly, a single script can generate multiple data files 214 based on more than one data file 214 or generate a single data file 216 based on multiple data files 214 (e.g., by consolidating the data files 214).

Figure 3:
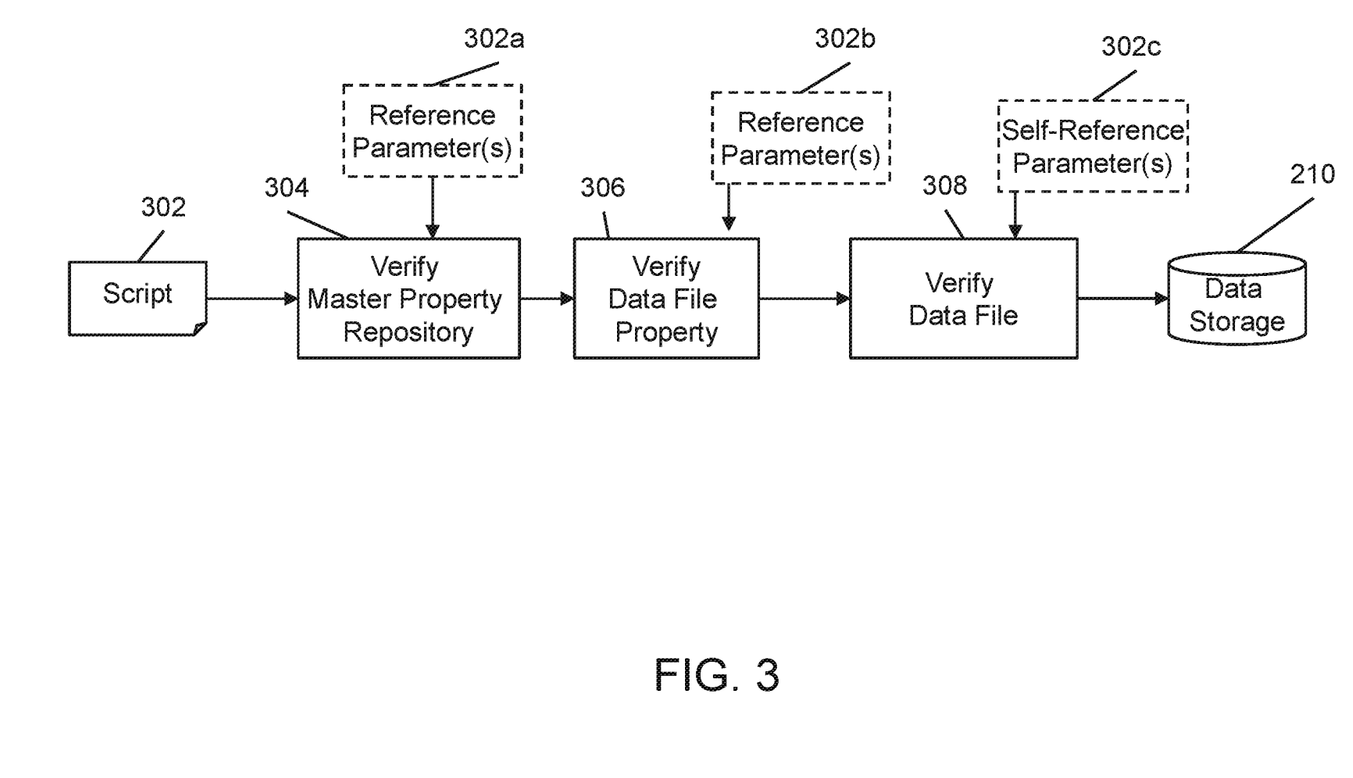
FIG. 3 is a block diagram of an example workflow complementary to the example workflow shown in FIG. 2 and shows part of evaluating the integrity of isolated digital assets with the disclosure herein.

FIG. 3 is a block diagram of an example workflow complementary to the example workflow shown in FIG. 2 and shows part of evaluating the integrity of isolated digital assets in accordance with the disclosure herein.

Figure 4A:
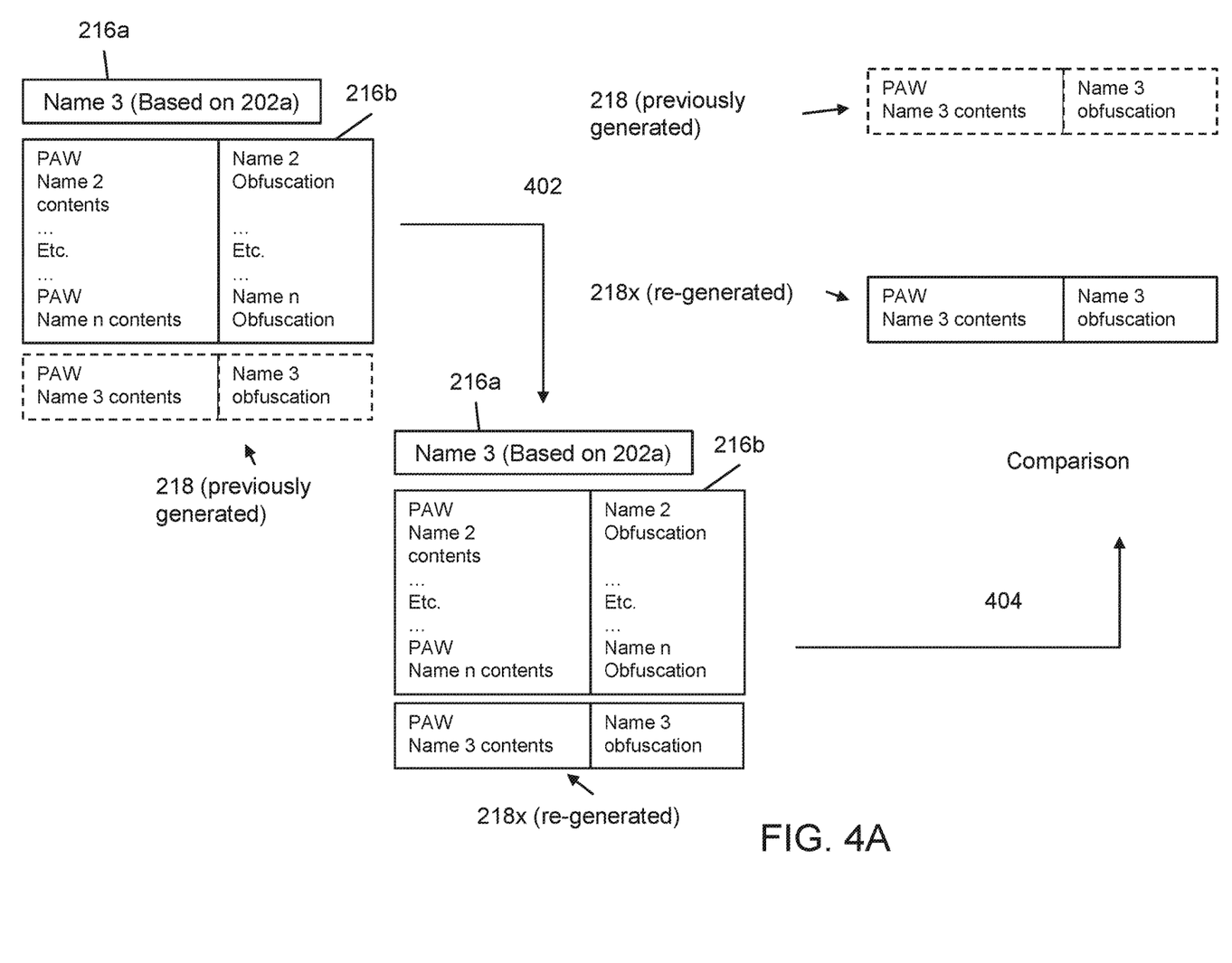
FIGS. 4A to 4C are block diagrams further describing the example workflow shown in FIG. 3.
Figure 4B:
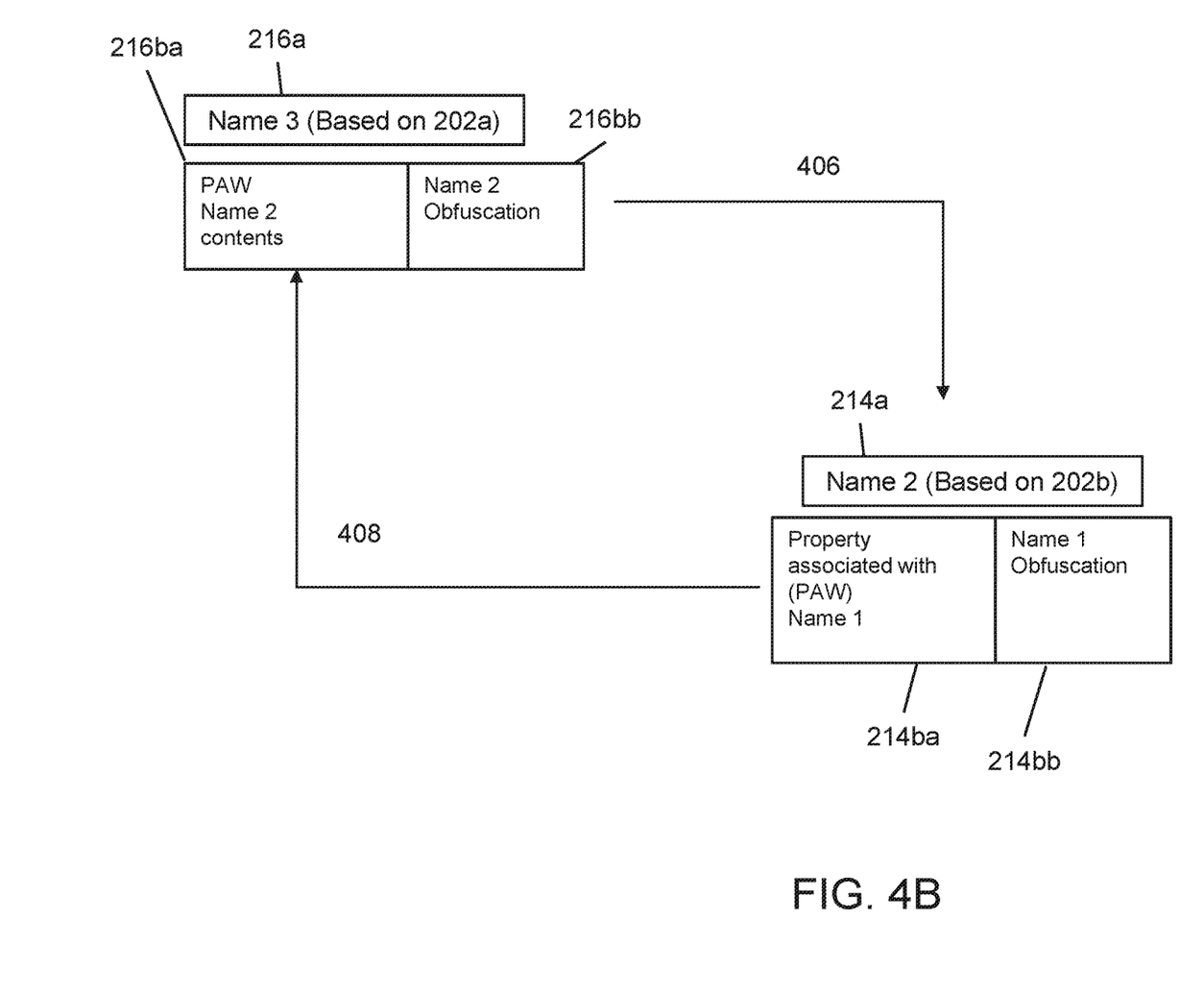
Figure 4C:
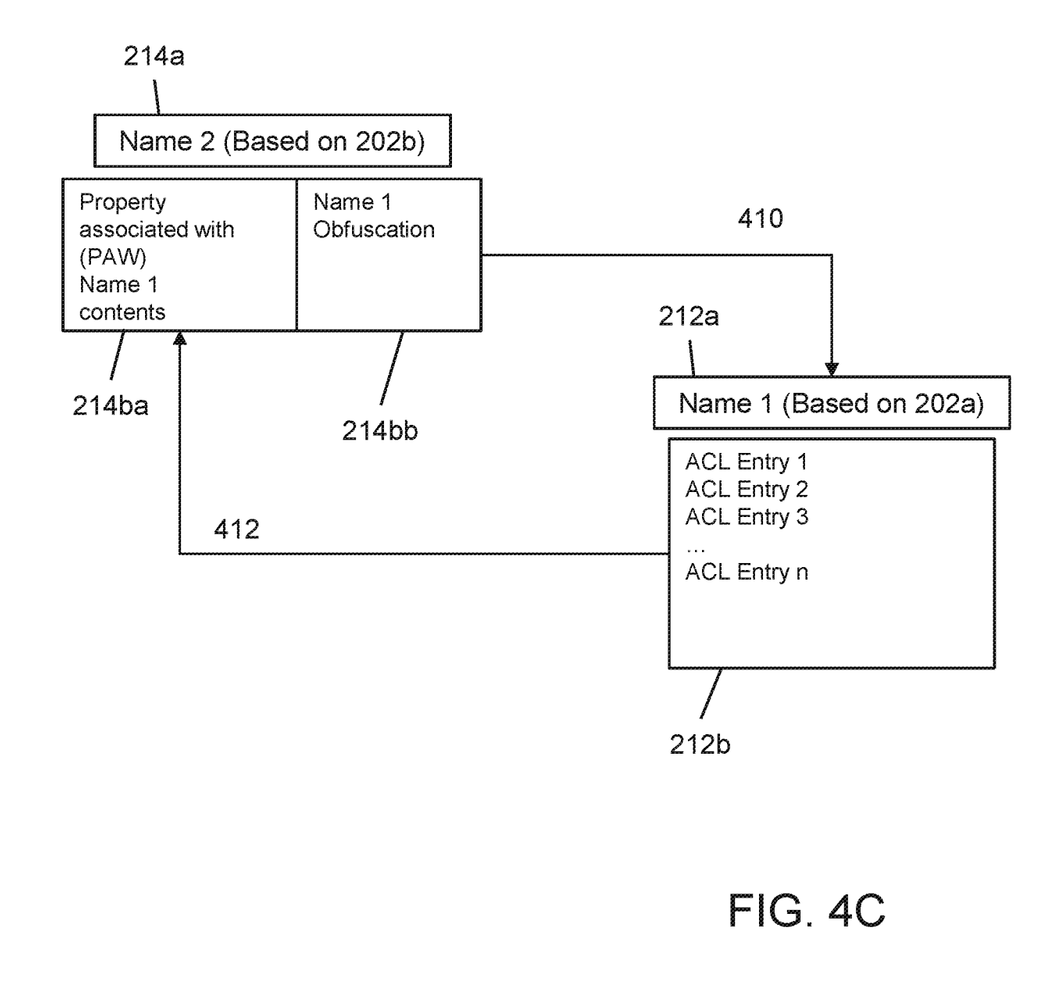

FIGS. 4A to 4C shall be referred to in reference to blocks 304, 306, and 308, and these figures show block diagrams that complement FIG. 3 in describing the example workflow shown in FIG. 3.

To verify data, a second script 302 is received by the isolated platform 10 in a manner similar to the first script 202. Similar to the first script 202, the second script 302 can be in whole, or in part self-contained. As with the first script 202, the second script 302 includes one or more parameters which are visually represented as parameters 302a, 302b, and 302c.

The isolated platform 10 can be configured to receive the scripts 202, 302 in limited circumstances. For example, the isolated platform 10 can be reconfigured to only execute scripts received from a particular device, at a particular time, with particular user credentials, in a particular sequence, etc.

At block 304, the data file 216 is verified. Verifying the data file 216 can include determining that the reference parameter 302a is complementary to reference parameter 202c, such that the second script 302 is able to parse the data file 216 (after insertion of the element 218) and locate the data element 218 therein. The second script 302 ingests the data element 218, and, with the reference parameter 302a, determines the delineation between portions 218a and 218b. For example, the second script 302 reference parameters 302a can be used to identify the portion 218a which includes the name of the data file 216. Based on this reference point within the implemented obfuscation policy, the second script 302 can determine where the related portion 218a resides.

The second script 302 stores the identified data element 218 for future reference in a location other than the data file 216 and removes the data element 218 from the data file 216. The second script 302 generates the data element 218x (see FIG. 4A), with the reference parameters 302a, generating the data element 218x in the same manner that the first script 202 generated data element 218 to compare to the previously extracted data element 218. That is, the extracted data element 218 can be used as a test reference feature. The second script 302 generates the first portion 218a based on the one-way function used in block 208 and generates the portion 218b similarly (block 402 in FIG. 4A). It is understood that generating the element 218 means that the second script 302 generates the data element 218 in the same manner as the first script, and not that the contents are identical (they are not, in the instance of tampering).

Verifying a data file 216 includes the second script 302 comparing the newly generated data file 218x (the test reference feature) to the previously extracted data file 218 (e.g., step 404 in FIG. 4A). If the two data files 218 do not match, evidence of tampering has been uncovered.

At block 306, the second script 302 verifies the data file 214. The reference parameters 302B can include parameters which enable the second script 302 to parse the data file 216 to determine a reference 216bb for a particular data file 214 (process 406 of FIG. 4B). The second script 302, using the determined reference 216bb, determines the name 214a of the relevant data file 214. The second script 302, similar to block 304, and based on the reference parameters 302b, and based on the determined name 214a, generates the property 216ba based on the located data file 214. The second script 302 thereafter compares the regenerated property 216ba to the original property 216ba (e.g., process 408 if FIG. 4B). If the re-created property in body 216ba matches the property in body 216ba stored in the data file 216, the second script 302 determines that the data file 214 is verified.

At block 308, the second script 302 verifies the data file 212. The second script 302, based on the reference parameters 302c, and similar to block 306, parses the data file body 214b to find the reference 214bb. Based on the found reference 214bb, the second script 302 searches for the data file 212 (e.g., process 410 of FIG. 4C).

The second script verifies the content of data file 212, after identifying the correct data file 212, by regenerating the immutable property of the data file body 212b and comparing the regenerated value with the value stored in body 214ba (e.g., process 412 shown in FIG. 4C).

In example embodiments, the body 214ba includes an immutable property of the name 212a, and the body 212b of the data file 212 is not used to determine an associated immutable property. This configuration may be advantageous in instances where the platform 10 is in restricted computing environments, where only limited processing is capable within a desired timeframe. As a result, the increase in speed in validating the data can be desirable.

In an embodiment where the body 214ba is not a property of the body 212b (e.g., tampering has been discovered, or the scripts are malfunctioning, etc.), the platform 10 can be configured to discard the data on which the data file 212 is based, and to revert to a previously verified data file.

The second script 302 can, similar to script 202, be configured to delete itself after providing the results of validation to a controller. For example, the script 302 can include instructions to email a platform 10 administrator the results of the analysis, and thereafter to remove itself.

The platform 10, or script 302 can determine that the integrity of the data element in question has been comprised as a result of any failure of any of blocks 304, 306, and 308.

In example embodiments, the evaluation can be failed in response to a first timing threshold being unsatisfied. For example, the second script 302 can be configured to track execution with a timer and compare a log of the length of time required to complete the script 302 with a pre-set threshold (e.g., 1 hour).

In example embodiments, the platform 10 performs the analysis with scripts 202, 302, periodically, on demand, or on a schedule (e.g., the first script 202 at the start of the week, the second script 302 at the end of the week, etc.). The platform 10 can perform multiple instances of the analysis with targeted scripts 202, 302, that search and evaluate data in subsections of the platform 10.

As alluded to above, the second script generates a report with the results of the evaluation. In response, an enterprise system 16 can act as a controller upon receiving the transmitted results to modify the found one or more properties searched for by the script 202. For example, the access permissions found and evaluated by the scripts 202, 302 can be changed to update a subsequent cloud storage of access permissions.

The enterprise system 16 can be configured to take one or more corrective actions in response to the evaluation failing. For example, the corrective actions can include quarantining the evaluated data file(s), deleting the data file, quarantine the isolated platform 10, switching deployment workflows to an alternative redundant isolated platform 10, etc.

Figure 5:
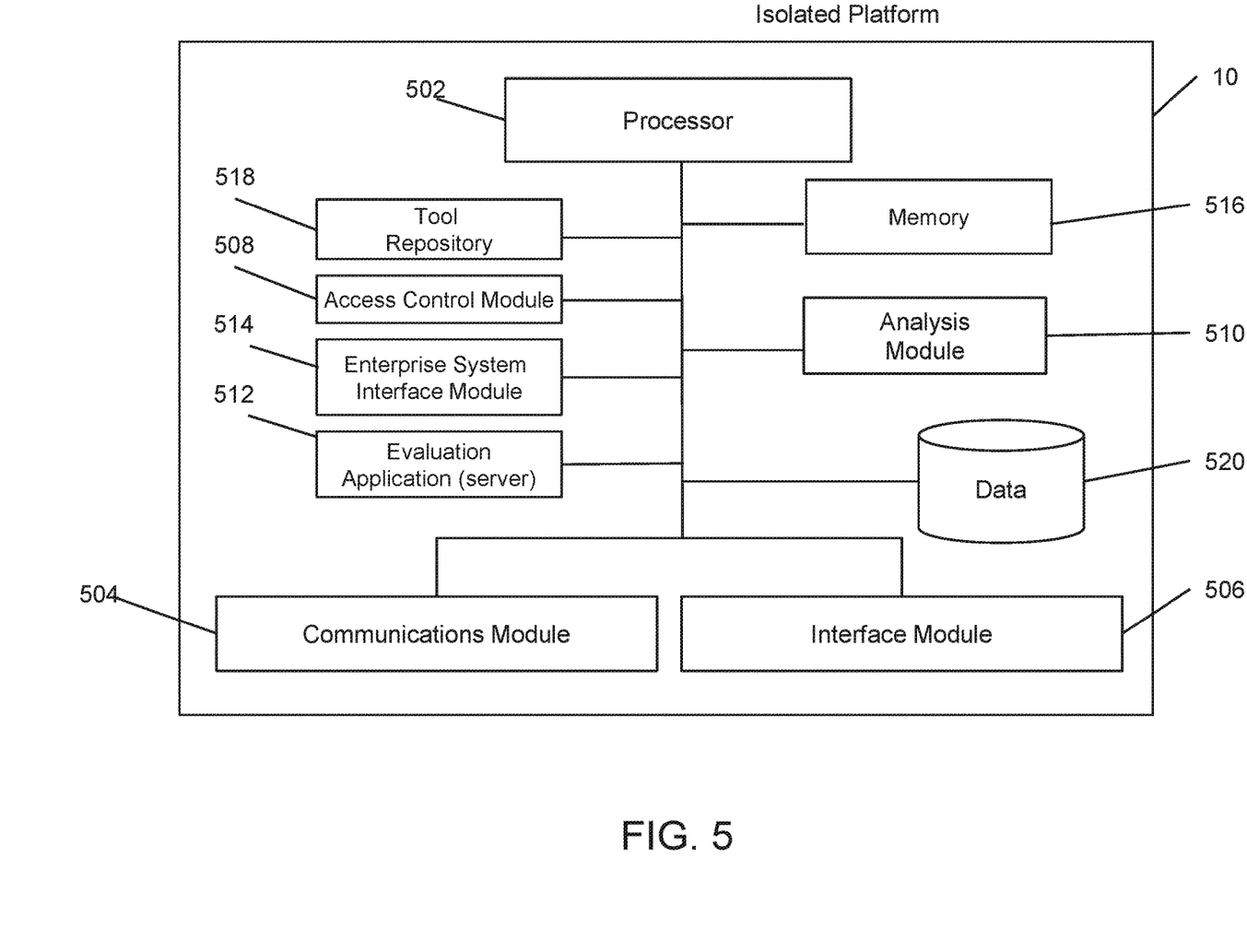
FIG. 5 is a block diagram of an example configuration of an isolated platform.

In FIG. 5, an example configuration of the isolated platform 10 is shown. In certain embodiments, the isolated platform 10 may include one or more processors 502, a communications module 504 to receive scripts (e.g., scripts 202 and 302), and an interface module 506 for interfacing with the datastores controlled by the isolated platform 10 (if any), and/or a local database 520. Communications module 504 enables the isolated platform 10 to communicate with one or more other components of the computing environment 8, such as client device 12 (or one of its components), via a bus or other communication network, such as the communication network 14. The isolated platform 10 includes at least one memory 516 or memory device that can include a tangible and non-transitory computer-readable medium having stored therein computer programs, sets of instructions, code, or data to be executed by processor 502. FIG. 5 also shows a tool repository 518, which can be stored in memory on the isolated platform 10 and operated by the processor 502 in order to execute received scripts. It can be appreciated that any of the tools (and modules, and applications) shown in FIG. 5 may at least in part be hosted externally and be available to the isolated platform 10, e.g., via the communications module 504. In the example embodiment shown in FIG. 5, the isolated platform 10 includes an access control module 508, the analysis module 510, the evaluation application 512, and an enterprise system interface module 514.

The analysis module 510 performs the analysis in accordance with one or more received scripts. For example, the analysis module may include designated hardware, or designated tools from the tool repository 518, etc., to conduct data element integrity analysis.

The access control module 508 may be used to apply a hierarchy of permission levels or otherwise apply predetermined criteria to determine what cloud database 18, other data stored in database 520, can be shared with which entity in the computing environment 8, and to determine which computing resources can be accessed by the isolated platform 10 and any processes implemented by the processors 502 thereon. For example, the isolated platform 10 may completely isolate certain data in the database 520, to prevent any tampering with source data (e.g., relying on reversion as a failsafe in place of the effort of recovery of data). In another example, the isolated platform 10 can have been granted access to only certain servers or computing resource blocks of the enterprise system 16 to conduct evaluations (e.g., all testing is done on servers that are not connected to sensitive data).

The isolated platform 10 may also include or host the server-side evaluation application 512 that enables client devices 12 to access or control the analysis module 510, or the tool repository 518. In example embodiments, the application 512 includes an application programming interface (API) to enable functionality of the platform 10 to be accessed via widely available software platforms, such as web browsers. The evaluation application 512 may also interface with, or be integrated into, the enterprise system interface module 514 to permit a seamless integration with existing user interfaces and tools associated with the enterprise system 16.

The enterprise system interface module 514 can provide a GUI or API connectivity to communicate with the enterprise system 16, to ingest enterprise data into the platform 10, or to provide data to the cloud database 18, or other datastore (if applicable). It can be appreciated that the enterprise system interface module 514 may also provide a web browser-based interface, an application or "app" interface, a machine language interface, etc.

Figure 6:
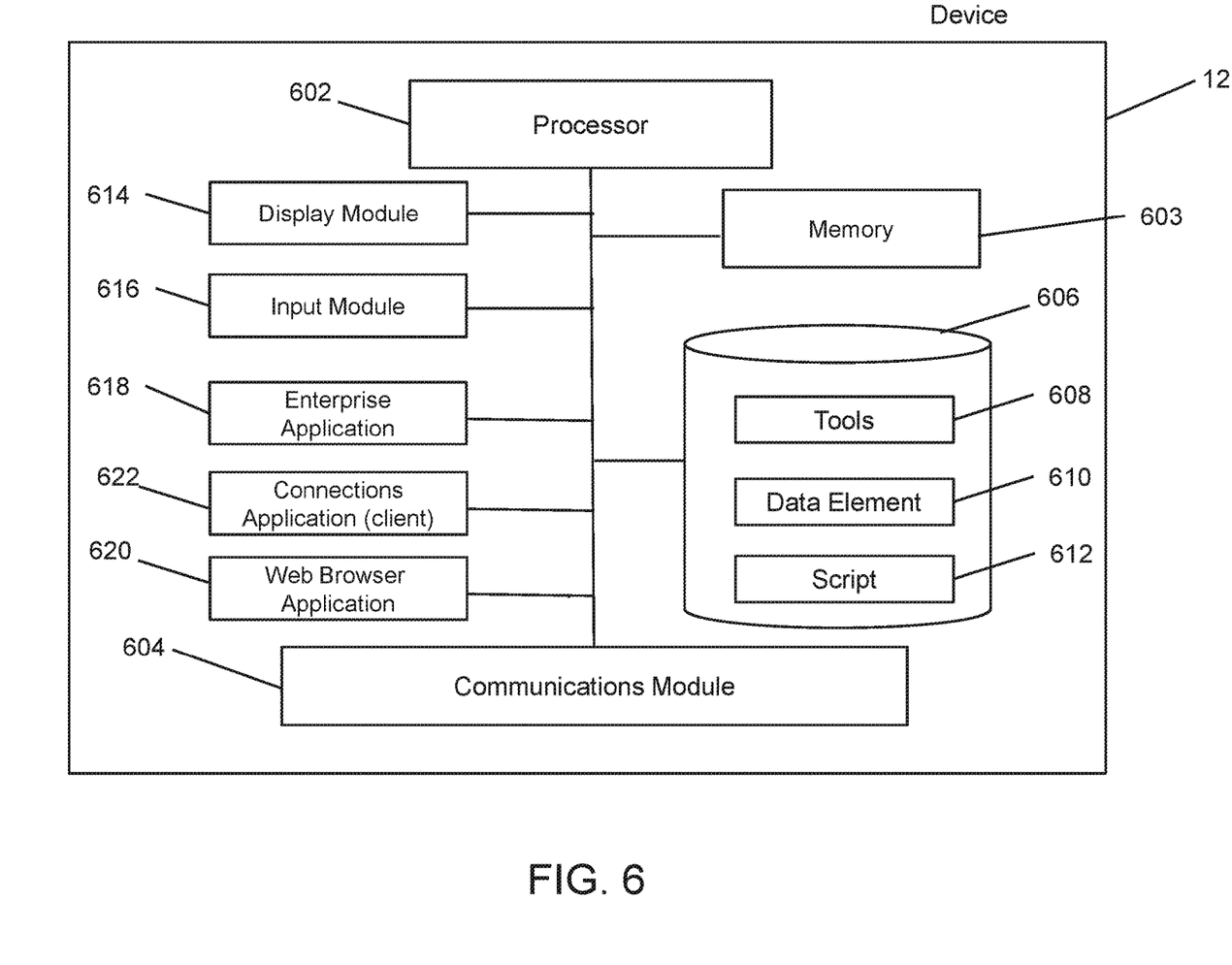
FIG. 6 is a block diagram of an example configuration of a computing device associated with a user, customer, or client.

In FIG. 6, an example configuration of the client device 12 is shown. In example embodiments, the client device 12 may include one or more processors 602, a communications module 604, and a datastore(s) 606, storing one or more of tools 608 (e.g., for inclusion with the scripts 612), or data elements 610 or scripts 612, or applications (not shown) that are to be ingested by the platform 10. Communications module 604 enables the client device 12 to communicate with one or more other components of the computing environment 8, such as the isolated platform 10 or enterprise system 16, via a bus or other communication network, such as the communication network 14. The client device 12 can include at least one memory 603 or memory device that can include a tangible and non-transitory computer-readable medium having stored therein computer programs, sets of instructions, code, or data to be executed by processor 602. FIG. 6 illustrates examples of modules and applications stored in memory on the client device 12 and operated by the processor 602. It can be appreciated that any of the modules and applications shown in FIG. 6 may also be hosted externally and be available to the client device 12, e.g., via the communications module 604.

In the example embodiment shown in FIG. 6, the client device 12 includes a display module 614 for rendering GUIs and other visual outputs on a display device such as a display screen, and an input module 616 for processing user or other inputs received at the client device 12, e.g., via a touchscreen, input button, transceiver, microphone, keyboard, etc. The client device 12 may also include an enterprise application 618 provided by the enterprise system 16, e.g., for performing mobile insurance, banking, or other financial product or services. The client device 12 in this example embodiment also includes a web browser application 620 for accessing Internet-based content, e.g., via a mobile or traditional website. In this example, the client device 12 also includes a connections application 622, which corresponds to a client-based application to access and interface with the evaluation application 512 hosted by the isolated platform 10.

The datastore 606 may be used to store device data, such as, but not limited to, an IP address or a MAC address that uniquely identifies client device 12 within the computing environment 8. The datastore 606 may also be used to store application data, such as, but not limited to, login credentials, user preferences, cryptographic data (e.g., cryptographic keys), etc.

It will be appreciated that only certain modules, applications, tools, and engines are shown in FIGS. 5 and 6 for ease of illustration and various other components would be provided and utilized by the isolated platform 10, enterprise system 16, and client device 12, as is known in the art.

Although not shown in FIGS. 5, 6, as noted above, the platform 10 and/or enterprise system 16 may also include a cryptographic module for performing cryptographic operations and providing cryptographic services. The cryptographic server can also be configured to communicate and operate with a cryptographic infrastructure.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in isolated platform 10 or enterprise system 16, or client device 12, or accessible or connectable thereto. Any application or module herein described may be implemented using computer readable/executable instructions that may be stored or otherwise held by such computer readable media.

Figure 7:
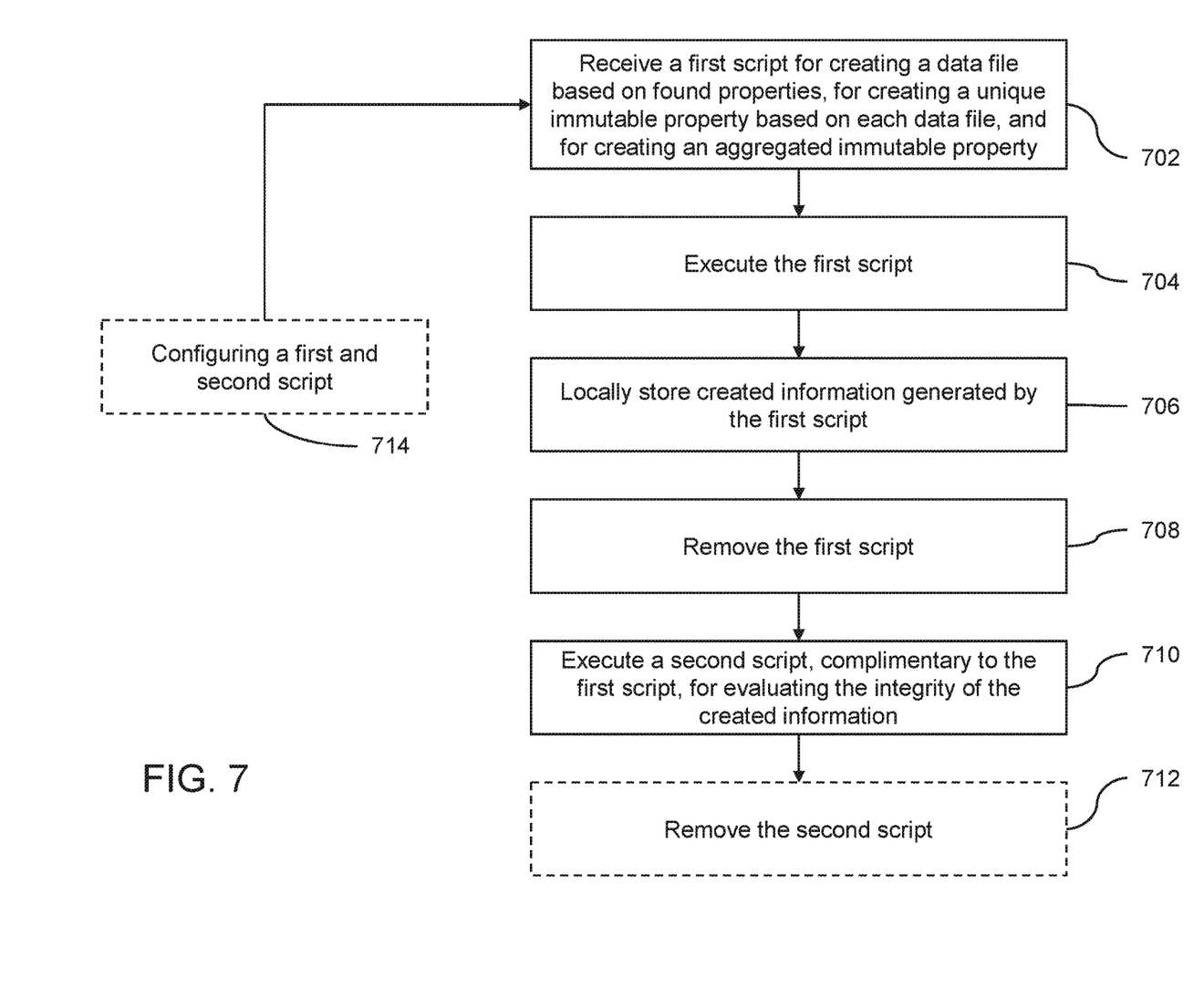
FIG. 7 is a flow diagram of an example of computer executable instructions for processing hierarchical data.

Referring now to FIG. 7, an example embodiment of computer executable instructions for conducting data integrity analyses is shown. In the following discussion of FIG. 7, reference shall be made to the preceding figures and discussion. It is understood that the reference to the preceding figures and discussion is intended to aid clarity and is not limiting.

At block 702, a first script (e.g., script 202) is received. The script is for creating a data file based on found properties, for creating a unique immutable property based on each data file, and for creating an aggregated immutable property list.

At block 704, the first script is executed. The first script can be executed by the analysis module 510.

At block 706, the results of block 704 are stored by the platform 10. For example, the results can be stored as a separate log file, a data file 212, a data file 214, and a data file 216.

At block 708, the first script is deleted.

At block 710, a second script, complementary to the first script, for evaluating the integrity of the created information is executed. The second script (e.g., script 302) can be received in a manner similar to the first script.

At block 712, optionally, the second script is removed. Removing the second script can beneficially reduce the amount of time that adversaries have to find and evaluate the second script, leading to an increased amount of protection.

Optionally, the shown process can include a precursor block, block 714. At block 714, a system remote to the platform 10 can generate the first and second scripts, and configure them with the necessary reference parameters to perform the methods described herein. The remote systems (e.g., enterprise system 16) can transmit the scripts (together, or sequentially), to the target isolated device, receive results from the second script, and thereafter perform corrective actions.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for conducting data integrity analyses, the device comprising:
    a processor; and
    a memory coupled to the processor, the memory storing computer executable instructions that when executed by the processor cause the device to:
        receive a first script, the first script comprising instructions to perform a search of the device for one or more properties, to create one or more data files based on found properties, to create a unique immutable property based on each respective data file of the one or more data files, and to create an aggregated immutable property list for all data files generated by the first script, wherein the first script comprises instructions to introduce into the aggregated immutable property list a reference feature based on the aggregated immutable property list;
        execute the first script, locally store created information generated by the first script, and delete the first script; and
        execute a second script, complementary to the first script, to perform an evaluation of integrity of the created information, wherein the second script comprises instructions to validate the aggregated immutable property list by (1) extracting the reference feature from the aggregated immutable property list;
        (2) creating a test reference feature based on the aggregated immutable property list after extraction; and (3) comparing the extracted reference feature to the test reference feature;
    wherein the device is at least in part isolated from an enterprise storing data elements on the device to isolate the data elements from subsystems of the enterprise.

2. The device of claim 1, wherein the created one or more data files comprise a list populated with results of the search.

3. The device of claim 1, wherein the one or more properties comprise access control properties of the one or more data elements.

4. The device of claim 1, wherein the second script is configured to self-delete after completion.

5. The device of claim 1, wherein the instructions cause the device to:
    indicate that the evaluation has failed in response to a first timing threshold being unsatisfied.

6. The device of claim 1, wherein the instructions cause the device to:
    transmit results of the evaluation to a controller to modify the found properties.

7. The device of claim 1, wherein the instructions cause the device to:
    validate the unique immutable property for each respective data file of the one or more data files based on contents of a validated aggregated immutable property list.

8. The device of claim 7, wherein the instructions cause the device to:
    validate each respective data file of the one or more data files based on validating the unique immutable property for the respective data file.

9. The device of claim 1, wherein reference feature is stored within the aggregated immutable property list based on an obfuscation policy.

10. The device of claim 1, wherein the aggregated immutable property list stores immutable properties based on each of the one or more data files along with data-specific reference properties, and the immutable properties are mapped to their respective data file based on the associated data-specific reference properties for validation.

11. The device of claim 10, wherein data-specific reference properties are generated based on a name of the respective data file.

12. The device of claim 1, wherein the data elements comprise data generated through machine learning.

13. A method for conducting data integrity analyses, the method comprising:
    transmitting a first script, the first script comprising instructions to perform a search of a target device for one or more properties, to create one or more data files a based on found properties, to create a unique immutable property based on each respective data file of the one or more data files, and to create an aggregated immutable property list for all data files generated by the first script, wherein the first script comprises instructions to introduce into the aggregated immutable property list a reference feature based on the aggregated immutable property list;
    wherein the first script is configured to locally store information generated by the first script upon execution, and delete the first script after execution; and
    transmitting a second script, complementary to the first script, to perform an evaluation of integrity of information generated by the first script, wherein the second script comprises instructions to validate the aggregated immutable property list by (1) extracting the reference feature from the aggregated immutable property list; (2) creating a test reference feature based on the aggregated immutable property list after extraction; and (3) comparing the extracted reference feature to the test reference feature;

wherein the target device is at least in part isolated from an enterprise storing data elements on the device to isolate the data elements from subsystems of the enterprise.

14. The method of claim 13, wherein the created one or more data files comprise a list populated with results of the search.

15. The method of claim 13, wherein the one or more properties comprise access control properties of the one or more data elements.

16. The method of claim 13, wherein the second script is configured to self-delete after completion.

17. The method of claim 13, further comprising:
validating the unique immutable property for each respective data file of the one or more data files based on contents of a validated aggregated immutable property list.

18. The method of claim 13, further comprising validating each respective data file of the one or more data files based on validating the unique immutable property for the respective data file.

19. The method of claim 13, wherein the data elements comprise data generated through machine learning.

20. A non-transitory computer readable medium for assessing potentially malicious data files, the computer readable medium comprising computer executable instructions for:
transmitting a first script, the first script comprising instructions to perform a search of a target device for one or more properties, to create one or more data files based on found properties, to create a unique immutable property based on each respective data file of the one or more data files, and to create an aggregated immutable property list for all data files generated by the first script, wherein the first script comprises instructions to introduce into the aggregated immutable property list a reference feature based on the aggregated immutable property list;

wherein the first script is configured to locally store information generated by the first script upon execution, and delete the first script after execution; and transmitting a second script, complementary to the first script, to perform an evaluation of integrity of information generated by the first script, wherein the second script comprises instructions to validate the aggregated immutable property list by (1) extracting the reference feature from the aggregated immutable property list; (2) creating a test reference feature based on the aggregated immutable property list after extraction; and (3) comparing the extracted reference feature to the test reference feature, wherein the target device is at least in part isolated from an enterprise storing data elements on the device to isolate the data elements from subsystems of the enterprise.

* * * * *